(12) United States Patent
Roland et al.

(10) Patent No.: US 10,287,448 B2
(45) Date of Patent: May 14, 2019

(54) UNIVERSAL PIGMENT PREPARATION

(71) Applicant: Evonik Degussa GmbH, Essen (DE)

(72) Inventors: Katrin Roland, Essen (DE); Christoph Duerr, Dorsten (DE); Frank Schubert, Neukirchen-Vluyn (DE); David Momper, Essen (DE); Aline Skotarczak, Essen (DE); Marco Blei, Essen (DE); Michael Ewald, Marl (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/622,657

(22) Filed: Jun. 14, 2017

(65) Prior Publication Data
US 2018/0010007 A1  Jan. 11, 2018

(30) Foreign Application Priority Data

Jul. 8, 2016 (EP) .................................. 16178526

(51) Int. Cl.
| | | |
|---|---|---|
| C09D 17/00 | (2006.01) | |
| C09D 5/00 | (2006.01) | |
| C08J 3/20 | (2006.01) | |
| C08J 3/22 | (2006.01) | |
| C08L 69/00 | (2006.01) | |
| C08J 3/205 | (2006.01) | |
| C09D 125/14 | (2006.01) | |
| C09D 175/06 | (2006.01) | |
| C09D 175/16 | (2006.01) | |
| C09B 67/46 | (2006.01) | |

(52) U.S. Cl.
CPC ............ *C09D 17/003* (2013.01); *C08J 3/205* (2013.01); *C09B 67/009* (2013.01); *C09B 67/0089* (2013.01); *C09D 17/005* (2013.01); *C09D 17/007* (2013.01); *C09D 125/14* (2013.01); *C09D 175/06* (2013.01); *C09D 175/16* (2013.01); *C08J 2367/02* (2013.01); *C08J 2371/02* (2013.01); *C08J 2467/02* (2013.01); *C08J 2471/02* (2013.01)

(58) Field of Classification Search
USPC ............................ 523/351; 524/601; 106/499
See application file for complete search history.

(56) References Cited

U.S. PATENT DOCUMENTS

| | | | |
|---|---|---|---|
| 5,777,045 A * | 7/1998 | Carr | C08G 59/12 525/438 |
| 6,063,182 A | 5/2000 | Babler | |
| 6,310,123 B1 | 10/2001 | Boinowitz et al. | |
| 6,342,273 B1 * | 1/2002 | Handels | B05D 1/007 427/475 |
| 6,423,130 B2 | 7/2002 | Boinowitz et al. | |
| 6,552,091 B1 | 4/2003 | Boinowitz et al. | |
| 6,613,863 B2 | 9/2003 | Kohlstruk et al. | |
| 6,669,984 B2 * | 12/2003 | Anchor | C09D 5/033 427/189 |
| 6,730,628 B2 | 5/2004 | Kohlstruk et al. | |
| 6,800,714 B2 | 10/2004 | Kohlstruk et al. | |
| 7,001,973 B2 | 2/2006 | Kohlstruk et al. | |
| RE39,746 E | 7/2007 | Boinowitz et al. | |
| 7,781,538 B2 | 8/2010 | Glockner et al. | |
| 7,834,098 B2 | 11/2010 | Wenning et al. | |
| 8,247,525 B2 | 8/2012 | Schubert et al. | |
| 8,268,939 B2 | 9/2012 | Ebbrecht et al. | |
| 8,283,422 B2 | 10/2012 | Schubert et al. | |
| 8,309,664 B2 | 11/2012 | Knott et al. | |
| 8,309,673 B2 | 11/2012 | Schubert et al. | |
| 8,324,325 B2 | 12/2012 | Knott et al. | |
| 8,334,355 B2 | 12/2012 | Henning et al. | |
| 8,420,567 B1 | 4/2013 | Naumann et al. | |
| 8,450,514 B2 | 5/2013 | Schubert et al. | |
| 8,476,189 B1 | 7/2013 | Naumann et al. | |
| 8,772,423 B2 | 7/2014 | De Gans et al. | |
| 8,779,079 B2 | 7/2014 | Henning et al. | |
| 8,802,744 B2 | 8/2014 | Knott et al. | |
| 8,883,932 B2 | 11/2014 | Brugger et al. | |
| 8,921,437 B2 | 12/2014 | Knott et al. | |
| 8,957,009 B2 | 2/2015 | Schubert et al. | |
| 8,974,627 B2 | 3/2015 | Schubert et al. | |
| 8,993,706 B2 | 3/2015 | Schubert et al. | |
| 9,035,011 B2 | 5/2015 | Ferenz et al. | |
| 9,051,424 B2 | 6/2015 | Lobert et al. | |
| 9,068,044 B2 | 6/2015 | Schubert et al. | |
| 9,115,335 B2 | 8/2015 | Trosin et al. | |

(Continued)

FOREIGN PATENT DOCUMENTS

| | | |
|---|---|---|
| CA | 2797528 A1 | 10/2011 |
| DE | 10310523 A1 | 9/2004 |

(Continued)

OTHER PUBLICATIONS

Fiedel et al., U.S. Appl. No. 15/395,449, filed Dec. 30, 2016.

(Continued)

*Primary Examiner* — Tae H Yoon
(74) *Attorney, Agent, or Firm* — Philip P. McCann; Nexsen Pruet, PLLC

(57) ABSTRACT

A universal pigment preparation including a flocculation-stabilizing medium including (a1) reaction products of di- or polycarboxylic acids or hydroxycarboxylic acids with di- or polyols, and (a2) reaction products of alkylene oxides with alkoxylatable compounds, and at least one pigment. Paints, varnishes, printing inks, coating materials, floor coatings, potting compounds and filling compounds may be made using the universal pigment preparation.

22 Claims, No Drawings

(56) References Cited

U.S. PATENT DOCUMENTS

| | | |
|---|---|---|
| 9,175,126 B2 | 11/2015 | Albrecht et al. |
| 9,221,945 B2 | 12/2015 | Alzer et al. |
| 9,315,614 B2 | 4/2016 | Schubert et al. |
| 9,334,354 B2 | 5/2016 | Ferenz et al. |
| 9,346,919 B2 | 5/2016 | Jazkewitsch et al. |
| 9,353,225 B2 | 5/2016 | Knott et al. |
| 9,440,220 B2 | 9/2016 | Naumann et al. |
| 9,550,928 B2 | 1/2017 | Lobert et al. |
| 9,751,971 B2 | 9/2017 | Veit et al. |
| 2006/0074217 A1 | 4/2006 | Gloeckner et al. |
| 2009/0048363 A1 | 2/2009 | Glockner et al. |
| 2009/0099332 A1 | 4/2009 | Glockner et al. |
| 2009/0137752 A1 | 5/2009 | Knott et al. |
| 2009/0198024 A1 | 8/2009 | Gloeckner et al. |
| 2010/0081781 A1 | 4/2010 | Schubert et al. |
| 2010/0222500 A1* | 9/2010 | Ahrens ............... C08G 65/26 524/577 |
| 2010/0266518 A1 | 10/2010 | Springer et al. |
| 2012/0028022 A1 | 2/2012 | Brugger et al. |
| 2012/0037036 A1 | 2/2012 | Veit et al. |
| 2012/0068110 A1 | 3/2012 | Schubert et al. |
| 2012/0190760 A1 | 7/2012 | Henning et al. |
| 2013/0041115 A1 | 2/2013 | Knott et al. |
| 2013/0245304 A1 | 9/2013 | Schubert et al. |
| 2013/0345318 A1 | 12/2013 | Schubert et al. |
| 2014/0256844 A1 | 9/2014 | Henning et al. |
| 2015/0093575 A1 | 4/2015 | Naumann et al. |
| 2015/0329752 A1 | 11/2015 | Albrecht et al. |
| 2016/0053051 A1 | 2/2016 | Schubert et al. |
| 2016/0130402 A1 | 5/2016 | Schubert et al. |
| 2016/0289366 A1 | 10/2016 | Duerr et al. |
| 2016/0311963 A1 | 10/2016 | Lobert et al. |
| 2017/0065951 A1 | 3/2017 | Roland et al. |
| 2017/0081464 A1 | 3/2017 | Fiedel et al. |
| 2017/0081469 A1 | 3/2017 | Fiedel et al. |
| 2017/0088667 A1 | 3/2017 | Fiedel et al. |
| 2017/0174817 A1 | 6/2017 | Günther et al. |
| 2017/0226285 A1 | 8/2017 | Lobert et al. |
| 2017/0240692 A1 | 8/2017 | Roland et al. |

FOREIGN PATENT DOCUMENTS

| | | |
|---|---|---|
| DE | 102011010580 A1 | 7/2012 |
| EP | 0940406 A2 | 9/1999 |
| EP | 1156086 A2 | 11/2001 |
| EP | 2361956 A1 | 8/2011 |
| GB | 2446322 | 8/2008 |
| JP | 2010119930 | 6/2010 |
| JP | 2015-503655 | 2/2015 |
| WO | 2006018341 A1 | 2/2006 |
| WO | 2006021479 A1 | 3/2006 |
| WO | 2006097378 A1 | 9/2006 |
| WO | 2007036488 A1 | 4/2007 |
| WO | 2007141114 A1 | 12/2007 |
| WO | 2007141119 A1 | 12/2007 |
| WO | 2009037014 A1 | 3/2009 |
| WO | 2009127668 A1 | 10/2009 |
| WO | 2010063531 A1 | 6/2010 |
| WO | 2010136279 A1 | 12/2010 |
| WO | 2010136280 A1 | 12/2010 |
| WO | 2010136281 A1 | 12/2010 |
| WO | 2011091933 A1 | 8/2011 |
| WO | 2011131682 A1 | 10/2011 |
| WO | 2011144644 A1 | 11/2011 |
| WO | 2012130674 A2 | 10/2012 |
| WO | 2013017360 A1 | 2/2013 |
| WO | 2013017365 A1 | 2/2013 |
| WO | 2013098045 A1 | 7/2013 |
| WO | 2013101197 A1 | 7/2013 |
| WO | 2014170072 A1 | 10/2014 |
| WO | 2014180622 A1 | 11/2014 |
| WO | 2015003875 A1 | 1/2015 |
| WO | 2015082264 A1 | 6/2015 |
| WO | 2015144404 A1 | 10/2015 |
| WO | 2015173302 A1 | 11/2015 |
| WO | 2015176920 A1 | 11/2015 |
| WO | 2015176921 A1 | 11/2015 |
| WO | 2016020138 A1 | 2/2016 |
| WO | 2016020201 A1 | 2/2016 |
| WO | 2016034375 A1 | 3/2016 |
| WO | 2016120023 A1 | 8/2016 |
| WO | 2017012873 A1 | 1/2017 |
| WO | 2017089068 A1 | 6/2017 |

OTHER PUBLICATIONS

Lobert et al., U.S. Appl. No. 15/508,386, filed Mar. 2, 2017.
Roland et al., U.S. Appl. No. 15/429,471, filed Feb. 10, 2017.
Search Report dated Jan. 27, 2017 in EP 16 178 526.6 (5 pages).

* cited by examiner

UNIVERSAL PIGMENT PREPARATION

This application claims the benefit of European Application No. 16178526.6 filed on Jul. 8, 2016, the disclosure of which is expressly incorporated herein by reference.

BACKGROUND

The present invention relates to a universal pigment preparation for blending with conventional dye and binder systems, and to the production thereof.

Universal pigment preparations are pigment preparations which have good meterability and are used for coloring both aqueous and solventborne paints.

In the production of universal pigment preparations, dispersants or emulsifiers are used, and these physically stabilize the pigment particles in their finely divided form in an aqueous or aqueous/organic medium. For the selection of the dispersants, in addition, compatibility in the various applications is essential. For example, the preparations should be introduced into the application medium easily and without flocculation or reaggregation of the pigment particles.

Since the introduction of water-thinnable basecoats and topcoats, paint manufacturers have had the problem of having to manufacture and stock every shade in the form of the water-thinnable paint and additionally of the solvent-based paint or the precursors in question, in order to be able to accommodate the different equipment used by the user.

It is necessary to use a specific grinding component for production of a suitable pigment paste for every paint system. After production of the pigment paste, one or more further binders in each case are used to complete the paint. These constituents have to be matched to one another in order to obtain a suitable coating medium; for example, it has to be storage-stable and meet the high visual demands. It is possible for grinding to be effected in the main paint binder or for special paste resins (grinding resins) to be used for production of the pigment paste. A general problem is the need to have to create and store a pigment paste for every different paint system for every shade. This makes manufacturing costly and necessitates holding of a large stock.

In the architectural paints segment, for example, universal pigment preparations are used for the coloring of white or transparent base paints. These paints fulfil both a decorative purpose and a protective purpose on buildings. For instance, a universal pigment preparation can be used to color a water-based dispersion wall paint and a solventborne alkyd-based wood paint. It is no longer necessary to go to the lengths of stocking and formulation development of two pigment preparations for the particular intended use. All that is required in hardware stores and specialist dealers is accordingly a dispenser system for blending of a great multitude of shades.

The prior art discloses that, for production of universal pigment preparations, alkylphenol ethoxylates (APEs), specifically octyl- and nonylphenol ethoxylates, are used as dispersing additives in an aqueous medium, since these have a good cost-benefit ratio. Regrettably, it has been found that the degradation products of the APEs are bioaccumulative and act as hormone analogues. For many applications, nonylphenol ethoxylates are therefore already banned. Use in coatings and paints is still legally permitted in Germany, but there is a strong trend in the industry to dispense with these raw materials.

As an alternative to APEs, it is possible to use dispersing additives based on styrene oxide. U.S. Pat. No. 6,552,091 and EP 0 940 406 describe the synthesis of such structures and the use thereof in aqueous universal pigment preparations.

DE10 2011 010580, by contrast, describes the use of oleyl ethoxylates and dispersing additives in aqueous universal pigment preparations. WO 2009/127668 A1 uses a grinding medium rather than a dispersing additive. These grinding media comprise an aqueous formulation composed of a water-thinnable alkyd resin and an acrylate resin. These grinding media can be used for production of aqueous universal pigment pastes.

The disadvantage of the above-described universal pigment preparations/pastes is the use of water. Thus, use in the field of isocyanate-crosslinked polyurethane coatings (2K PU) is not possible. Universal pigment preparations are therefore not used nowadays in the field of industrial paint systems, where the use of 2K PU coatings is standard practice.

WO 2006 097378 describes an aqueous and solventborne pigment preparation composed of a ketone-formaldehyde grinding resin and a styrene oxide-containing dispersant as grinding medium. The solvent used is, for example, butylglycol. It is stated that these pigment preparations can be used both in solventborne and in solvent-free paints. There is no description of use in 2K PU coatings.

SUMMARY

The use of water-compatible organic solvents in universal pigment preparations would enable use in the field of 2K PU coatings and hence in industrial coatings. However, butylglycol, for example, is suspected of being toxic. It is additionally desirable to reduce the volatile organic content (VOC) in paints, and ultimately also in pigment preparations. The ChemVOCFarbV (German chemical legislation to limit the emissions of volatile organic compounds (VOCs) by restricting the circulation of solventborne paints and coatings) regulates the use of VOCs in architectural paints and motor vehicle paint systems. This legislation has triggered a general trend in the paints and coatings industry, and so industrial paint manufacturers too are now trying to reduce VOCs. In China, a tax has recently been introduced on VOCs in paint products. This too has triggered a wave of reformulation.

A VOC-free alternative is solid pigment preparations with 100% active ingredient. A "stir-in" pigment preparation is described in U.S. Pat. No. 6,063,182. The scope of application includes aqueous paints and coatings. However, a disadvantage is the grinding of the pigments in the aqueous medium and the subsequent spray-drying to give the solid material. EP 2 361 956 A1 describes a composition composed of pigment, binder, resin and further additives, in order to produce solid pigment preparations therefrom, for example in tablet form. Production is effected in neat form, preferably without organic solvents or water. According to the formulation, these pigment preparations can be adapted for a wide variety of different applications.

In spite of the environmental friendliness and supposedly greater user-friendliness, solid pigment preparations have not become established to date on the market. The reasons for this are, for example, limited universality, poorer distribution and/or longer distribution time on incorporation into the basecoat compared to liquid preparations, and poorer meterability in the color matching, the exact setting of the hue.

There is therefore a need to develop a universal pigment preparation suitable for virtually all commercial binder systems, both aqueous-based and organic solvent-based. It is desirable that it also be suitable for isocyanate-crosslinked polyurethane coatings.

DETAILED DESCRIPTION

It has been found that, surprisingly, a universal pigment preparation comprising
a flocculation-stabilizing medium comprising
(a1) reaction products of di- or polycarboxylic acids or hydroxycarboxylic acids with di- or polyols and
(a2) reaction products of alkylene oxides with alkoxylatable compounds,
and
at least one pigment
can be used for this purpose.

The universal pigment preparation of the invention is suitable for coloring both aqueous and solventborne paints, and especially also two-component polyurethane (2K PU) coatings.

Preferably, the universal pigment preparation of the invention has a weight ratio of flocculation-stabilizing medium to pigment of 95:5 to 5:95, preferably 90:10 to 10:90, more preferably 85:15 to 15:85.

Preferably, the weight ratio of reaction products (a1) to reaction products (a2) is 10:90 to 90:10, preferably 20:80 to 80:20, more preferably 40:60 to 60:40.

The flocculation-stabilizing medium according to the invention is based on a mixture of reaction products (a1) and reaction products (a2).

The reaction products (a1) are obtained by reaction of di- or polycarboxylic acids or hydroxycarboxylic acids and di- or polyols, with use of at least one di- or polycarboxylic acid or hydroxycarboxylic acid and at least one di- or polyol component.

Preference is given to using at least one unsaturated di- or polycarboxylic acid. Thus, the preferred polyesters according to the invention are unsaturated polyesters.

The term "di- and polycarboxylic acids" as used herein in the context of the present invention also encompasses the corresponding anhydrides and esters of the di- and polycarboxylic acids described. The esters are preferably alkyl esters, more preferably methyl or ethyl esters.

It is conceivable to use mixtures of di- and polycarboxylic acids and the anhydrides and/or esters thereof.

The unsaturated di- or polycarboxylic acids are preferably α,β-unsaturated di- or polycarboxylic acids.

More preferably, the di- or polycarboxylic acids are mixtures of saturated and α,β-unsaturated di- or polycarboxylic acids in a molar ratio of 1:99 to 99:1, preferably 80:20 to 40:60, more preferably 70:30 to 60:40.

It is possible with preference to use di- or polycarboxylic acids selected from citraconic, fumaric, itaconic, maleic and/or mesaconic acid, cyclohexane-1,4-dicarboxylic acid, malonic acid, succinic acid, glutaric acid, methyltetra- and methylhexahydrophthalic acid, hexahydrophthalic acid, tetrahydrophthalic acid,
dodecanedioic acid, pimelic acid, adipic acid, azelaic acid, suberic acid, sebacic acid, or the anhydrides or esters thereof, more preferably hexahydrophthalic acid, tetrahydrophthalic acid, adipic acid or fumaric acid, or the anhydrides or esters thereof or mixtures thereof.

It is also possible with preference to use aromatic di- and polycarboxylic acids selected from phthalic acid, isophthalic acid, terephthalic acid, pyromellitic acid or trimellitic acid, or the anhydrides or esters thereof or mixtures thereof.

Preferably, the anhydrides are succinic anhydride, phthalic anhydride, maleic anhydride, pyromellitic anhydride, hexahydrophthalic anhydride, methylhexahydrophthalic anhydride, tetrahydrophthalic anhydride, methyltetrahydrophthalic anhydride or trimellitic anhydride or mixtures thereof.

Preferably, the hydroxycarboxylic acids are lactic acid, hydroxystearic acid, ricinoleic acid, salicylic acid, malic acid, citric acid, glycolic acid, isocitric acid, mandelic acid, tartronic acid, tartaric acid, hydroxybutanoic acid, hydroxypentanoic acid or hydroxyhexanoic acid and esters thereof, preferably the cyclic esters or ester dimers thereof, more preferably lactide, valerolactone or caprolactone, or mixtures thereof.

It is likewise conceivable to use mixtures of di- and polycarboxylic acids and the anhydrides and/or esters thereof with hydroxycarboxylic acids and/or esters thereof.

Preferably, the di- or polyols are polyalkylene glycols.

The OH number of the polyalkylene glycols is preferably greater than 0 mg KOH/g.

Particular preference is given to polyalkylene glycols of the formula (I)

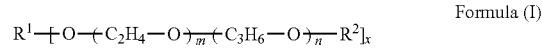

Formula (I)

with
x=1, 2, 3 or 4 to 10, with the proviso that:
in the case that x=1 the $R^1$ and $R^2$ radicals are hydrogen,
in the case that x=2, 3 or 4 to 10 the $R^1$ radical is a linear or branched, saturated or mono- or polyunsaturated aliphatic, cycloaliphatic or aromatic hydrocarbyl radical having 2 to 50 carbon atoms, preferably having 3 to 30 carbon atoms, which may be interrupted by heteroatoms such as oxygen, nitrogen or sulphur, and $R^2$ is a hydrogen, where the segments attached to $R^1$ in a number of x may be of the same or different structure,
m=0, 1, 2 or 3 to 100, preferably 0, 1, 2 or 3 to 35,
n=0, 1, 2 or 3 to 100, preferably 0, 1, 2 or 3 to 30,
with the proviso that the product x*(m+n)=2, 3 or 4 to 100, preferably 2, 3 or 4 to 35.

It is possible here for the repeat units $(-C_2H_4-O-)_m$ and $(-C_3H_6-O-)_n$ to be arranged preferably in blocks, in random distribution or in a gradient distribution in the polymer chain.

Preferably, the polyalkylene glycols are polypropylene glycols or polypropylene-polyethylene glycols having a number-average molar mass of 100 to 2000 g/mol, preferably of 140 to 1500 g/mol, more preferably of 180 to 1000 g/mol (measured by the GPC 2 method described below).

The reaction products (a1) preferably have an acid number, determined to DIN EN ISO 2114, between 1 and 150 mg KOH/g, preferably between 1 and 50 and more preferably between 1 and 20 mg KOH/g. The acid number (AN) is understood to mean the amount of potassium hydroxide in mg needed to neutralize the acids present in one gram of solid. The sample for analysis is dissolved in dichloromethane and titrated with 0.1 N ethanolic potassium hydroxide solution using phenolphthalein.

Furthermore, the reaction products (a1) preferably have an OH number between 1 and 450 mg KOH/g, preferably between 10 and 200 mg KOH/g and more preferably between 20 and 130 mg KOH/g.

The reaction products (a1) preferably have a theoretical double bond content of 0 to 3 mmol/g, preferably 0 to 2 mmol/g, more preferably 0.1 to 0.7 mmol/g.

The reaction products (a1) especially have a number-average relative molar mass Mn between 500 and 10 000 g/mol, preferably between 750 and 4000 g/mol, more preferably between 1000 and 3000 g/mol. The latter can be adjusted in a manner familiar to the person skilled in the art via the molar ratios of the reactive groups of the raw materials and the conversion (measured by the GPC 1 method described below).

The reaction products (a1) are preferably prepared by (semi-)continuous or batchwise esterification and condensation of the starting acids and alcohols, in one-stage or multistage mode. The reaction products (a1) are preferably synthesized via condensation in neat form. For this purpose, in accordance with the invention, the di- or polycarboxylic acids or hydroxycarboxylic acids used are reacted with di- or polyols. The polycondensation is preferably effected at temperatures between 120 and 280° C., preferably between 150 and 250° C., within 1 to 60 hours. In the course of this, a majority of the amount of water released its first distilled off at standard pressure. Later on, the rest of the water and volatile di- or polyols are eliminated until the desired molecular weight has been attained. This can optionally be facilitated by means of reduced pressure or by passing an inert gas stream through the reaction mixture. In the case of use of the acid components in the form of alkyl esters, the volatile alcohols obtained in the ester cleavage are also removed. The reaction can additionally be accelerated by addition of an azeotrope former and/or of a catalyst, before or during the reaction. Examples of suitable azeotrope formers are toluene and xylenes. Typical catalysts are organotitanium or organotin compounds such as tetrabutyl titanate or dibutyltin oxide. Also conceivable are catalysts based on other metals, such as zinc or antimony, for example, and also metal-free esterification catalysts.

In a further embodiment, it is possible to add alkanolamines, preferably N-methyldiethanolamine, triethanolamine, triisopropylamine, 2-(dimethylamino)ethanol, as further alcohol component in the preparation of the reaction products (a1).

In addition, it is possible to use further additives and processing auxiliaries such as antioxidants or free-radical and color stabilizers.

In another embodiment, it is necessary to increase the molar mass of the reaction products (a1) by suitable modification.

Preferably, the terminal hydroxyl groups of the reaction products (a1) formed from hydroxycarboxylic acids and di- or polyols can be converted further. The further conversion can be conducted with di- or polycarboxylic acids, glycidyl esters or isocyanates, preferably diisocyanates or dicarboxylic acids.

Preferably, the reaction products (a2) are prepared by an alkoxylation reaction of alkoxylatable compounds of the formula (II)

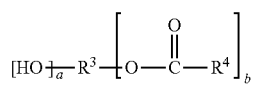

Formula (II)

where $R^3$ is a linear or branched, saturated or mono- or polyunsaturated, aliphatic, cycloaliphatic or aromatic hydrocarbyl radical having 2 to 50 carbon atoms, preferably having 3 to 30 carbon atoms, which may be interrupted by heteroatoms such as oxygen, nitrogen or sulphur, $R^4$ is a linear or branched, saturated or mono- or polyunsaturated aliphatic, cycloaliphatic or aromatic hydrocarbyl radical which may be interrupted by heteroatoms such as oxygen, nitrogen or sulphur and may be substituted by OH groups, having 1 to 22 carbon atoms, preferably having 6 to 20 carbon atoms, a=1 to 8, preferably 2 to 6, b=0 to 7, preferably 1 to 4, more preferably not more than 3, with the proviso that the sum total of a and b=2 to 8, preferably 3 to 6, more preferably less than 6, with alkylene oxides.

Preferably, the alkoxylatable compounds are diols, polyols, ethylene glycol, diethylene glycol, polyethylene glycol, propylene glycol, dipropylene glycol, polypropylene glycol, polyetherols, hexanediol, butanediol, neopentyl glycol, hexylene glycol, ricinoleic acid, hydroxystearic acid and polyhydroxystearic acid, glycerol, polyglycerol, pentaerythritol, trimethylolpropane, poly-OH-functional phenols such as novolaks or polyphenols, sorbitol, sorbitan, isosorbide, mannitol and sugars such as glucose, sucrose and esters thereof, and fatty acids such as oleic acid, lauric acid, stearic acid, preferably hydroxystearic acid, glycerol, polyglycerol, pentaerythritol, trimethylolpropane and fatty acid esters of sorbitan.

Preferred $R^4$ radicals in formula (II) are those which derive from compounds from the group of the monobasic carboxylic acids, the aromatic carboxylic acids or the cycloaliphatic carboxylic acids. Particular preference is given to the $R^4$ radicals which derive from a fatty acid. Especially preferred are the $R^4$ radicals which derive from hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid (stearic acid), hydroxystearic acid, nonadecanoic acid, eicosanoic acid, 2-ethylhexanoic acid, isononanoic acid, 3,5,5-trimethylhexanoic acid, neodecanoic acid, isotridecanoic acid, isostearic acid, undecylenoic acid, oleic acid, linoleic acid, ricinoleic acid, linolenic acid, benzoic acid, cinnamic acid.

Preferred alkoxylatable compounds of formula (I) are glycerol, polyglycerol, trimethylolpropane, pentaerythritol, fatty acid esters of sorbitan and poly-OH-functional compounds that derive from natural substances, such as sorbitol, sorbitan, isosorbide, mannitol and sugars such as glucose, sucrose and the esters thereof with fatty acids such as oleic acid, lauric acid, ricinoleic acid, stearic acid and hydroxystearic acid.

Where reference is made within the scope of this invention to natural products, for example sorbitol, what is meant is basically all the isomers, preferably the isomers which occur naturally in each case, and thus in the present case D-(-)-sorbitol. Natural products are defined by reference to the scope of the "Dictionary of Natural Products", Chapman and Hall/CRC Press, Taylor and Francis Group, e.g. in the online version from 2011: http://dnp.chemnetbase.com/.

It is also possible to use any desired mixtures of alkoxylatable compounds of the formula (II) in the context of the invention. If a plurality of alkoxylatable compounds are used as a mixture, a and b may also be subject to a statistical distribution.

Alkoxylatable compounds are understood in the context of the present invention to mean compounds which form the start of the reaction products (a2) or alkoxylation products to be prepared, which are obtained by the addition of alkylene oxides.

The reaction products (a2) used in accordance with the invention are prepared by alkoxylation reaction. Alkoxylation reactions are widely known to the person skilled in the art, and reaction products (a2) are the reaction products of a polyaddition of alkylene oxides such as ethylene oxide, propylene oxide, butylene oxide and/or styrene oxide onto the OH functions of the alkoxylatable compounds of the formula (II).

Preference is given in accordance with the invention to using ethylene oxide and propylene oxide, and any desired mixtures of the two alkylene oxides.

The epoxide monomers can be used in pure or mixed form. The oxyethylene and oxypropylene units of the polyether chains are distributed either in blocks or randomly in the polyether chain (reaction products (a2)).

It is also possible to effect continuous metered addition of a further epoxide over time into an epoxide already present in the reaction mixture in order to bring about an increasing concentration gradient of the continuously added epoxide. The polyoxyalkylenes formed are thus subject to a random distribution in the end product. The correlations between metered addition and product structure are known to those skilled in the art.

Catalysts used for the alkoxylation reaction are the alkaline catalysts known to those skilled in the art, such as potassium hydroxide, potassium hydroxide solution, sodium methoxide or potassium methoxide. Starting compound and catalyst are initially charged in the reactor at the start of the process prior to the metered addition of alkylene oxide, it being necessary to adjust the amount of catalyst so as to give sufficient catalytic activity for the process. The reaction temperature is preferably 80 to 220° C., more preferably 100 to 180° C. The internal reactor pressure is preferably 0.5 bar to 15 bar, preferably 1.0 to 12 bar (absolute).

After the epoxide addition has ended, there preferably follows a period of further reaction for completion of the conversion. The further reaction can be conducted, for example, by continued reaction under reaction conditions (i.e. maintenance, for example, of the temperature and the pressure) without addition of reactants. Preferably, the further reaction is effected with mixing of the reaction mixture, especially with stirring.

Unreacted epoxides and any further volatile constituents can be removed, for example, by vacuum distillation, steam or gas stripping, or other methods of deodorization. In an optional subsequent step, the reaction product is neutralized with an acid such as lactic acid, acetic acid, propionic acid or phosphoric acid, and the salts formed are optionally removed by filtration.

Optionally, further substances such as stabilizers and antioxidants can be added to the reaction products (a2).

Reactors used for the alkoxylation in the first process step may in principle be any suitable reactor types that allow control over the reaction and its exothermicity. The first process step can be effected continuously, semi-continuously or else batchwise, in a manner known in chemical engineering.

The prior art includes various documents in which alcohols, carboxylic acids or amines are used as starter compounds for the alkoxylation reaction. A good overview of polyoxyalkylenes and processes for preparing polyoxyalkylenes is given by "N. Schönfeldt, Surface Active Ethylene Oxide Adducts, Pergamon Press, 1969".

The reaction products (a2) preferably have a weight-average molar mass of 300 to 15 000 g/mol, more preferably of 400 to 5000 g/mol and more preferably of 500 to 2800 g/mol, and are subject to a molar mass distribution (measured by the GPC 2 method described below).

The reaction products (a2) are preferably colorless to orange or brownish products which can be clear or opaque. According to the structure of the polyoxyalkylene chain, the products are liquid, waxy or solid at room temperature.

Preference is given to liquid products with less than 10 000 mPas (100 1/s, 25° C.), further preferably less than 8000 mPas (at 100 1/s, 25° C.), more preferably less than 5000 mPas (at 100 1/s, 25° C.).

In the alkali-catalysed alkoxylation reaction for preparation of the reaction products (a2), 3 to 200 mol, preferably 5 to 150 mol and more preferably 10 to 100 mol of alkylene oxide are used, based on the sum total of a and b.

The characterizing feature of the reaction products (a2) is the presence of polyoxyalkylene chains. Especially suitable are reaction products (a2) which originate from those starters of the formula (II) where the index b is zero, i.e. where no carboxyl radicals are present. It may thus be advantageous in selected applications to fully or partly cap the terminal OH groups in order to avoid, for example, unwanted reactions or interactions with other components in the universal pigment preparations.

Preference is therefore also given to reaction products (a2) where one or more OH groups have been etherified with an alkyl group, especially with a methyl group. The methylation of the OH groups can be conducted, for example, with the aid of methyl chloride by the principle of the Williamson ether synthesis.

Preference is likewise given to reaction products (a2) where one or more OH groups have been esterified. Such compounds are prepared, for example, by esterification of the OH groups with fatty acids, acetic acid or acetic anhydride.

It is also possible to use reaction products (a2) which have only been partially end-capped and still have residual OH groups.

If index b in formula (II) is not zero, the polyethers of component a2 used in accordance with the invention are complex polymeric product mixtures that cannot be described by a simple chemical formula.

The person skilled in the art is aware that, under alkaline alkoxylation conditions, the carboxylate radicals are partly eliminated to form a carboxylate compound and OH compound. These cleavage products which form may themselves function as starter compounds for the polyaddition of alkylene oxides. At the same time, transesterification reactions can take place, so as to give rise to a product mixture of complex composition.

Preferably, the pigments are organic or inorganic pigments or carbon black pigments.

Examples of inorganic pigments include iron oxides, chromium oxides or titanium oxides.

Suitable organic pigments are, for example, azo pigments, metal complex pigments, anthraquinoid pigments, phthalocyanine pigments, and polycyclic pigments, especially those of the thioindigo, quinacridone, dioxazine, pyrrolopyrrole, naphthalenetetracarboxylic acid, perylene, isoamidolin(on)e, flavanthrone, pyranthrone or isoviolanthrone series.

Carbon blacks used may be gas blacks, lamp blacks or furnace blacks. These carbon blacks may additionally be post-oxidized and/or converted to beads.

The pigment preparation according to the invention preferably contains 0.5% to 85.5% by weight of reaction products (a1),
0.5% to 85.5% by weight of reaction products (a2) and
5% to 95% by weight of at least one pigment selected from the group of the organic, inorganic or carbon black pigments.

It is optionally possible to add further auxiliary components. An auxiliary component in this context is any component that has a positive effect on the properties of the universal pigment preparation according to the invention. It is possible to add one or more auxiliary components independently of one another. Listed hereinafter are some auxiliary components that can be used for the universal pigment preparation according to the invention. The enumeration is non-conclusive.

Auxiliary components usable advantageously are especially wetting and dispersing additives. A multitude of wetting and dispersing additives which can be used for the universal pigment preparations according to the invention is available on the market. As a suitable chemical basis, mention may be made, for example, of styrene-maleic anhydride copolymers, acrylates, polyethers, e.g. styrene oxide polyethers, polyesters, amino polyesters, polyurethanes and amino polyethers. The additives may have different topologies, for example linear, branched, comb-like or star-shaped. Typically, wetting and dispersing additives have a heterogeneous structure divided into a bonding group and a stabilizing side-chain.

As well as pigments, it is also possible to use fillers in the universal pigment preparations according to the invention. Suitable fillers are, for example, those based on kaolin, talc, mica, other silicates, quartz, cristobalite, wollastonite, perlite, diatomaceous earth, fibrous fillers, aluminium hydroxide, barium sulphate, glass or calcium carbonate.

Synergists are pigment-like solids which can be used, for example, to improve the rheology of a pigment preparation. Examples include phthalocyanine-based synergists.

The use of a defoamer or deaerating agent may be advantageous in order to actively reduce the amount of air introduced in processing or production operations. Examples include those based on mineral oil or vegetable oil or based on polyether siloxanes, in some cases filled with particulate components, for example silica.

A humectant is a moisture-retaining agent which is used in pigment preparations in order to prevent surface drying. Examples include short-chain polyethers.

It may be advantageous to use an acidic or basic neutralizing agent in the universal pigment preparation according to the invention, in order to improve compatibility with the later basecoat. Acidic neutralizing agents used are liquid carboxylic acids, for example monomeric or polymeric fatty acids or acidic polyesters. Basic neutralizing agents used may be low molecular weight amines, for example triethanolamine, triisopropanolamine, 2-(dimethylamino)ethanol, 2-amino-2-methyl-1-propanol or ammonia, or polymeric amines, for example amino polyethers or amino polyesters.

Examples of further auxiliary components may include binders, dyes, surface additives, compatibilizers, UV stabilizers and preservatives.

Preferably, the universal pigment preparation according to the invention has a volatile organic content of <20% by weight, preferably <10% by weight, more preferably <5% by weight.

It preferably has a free-flowing consistency at room temperature.

It preferably has a viscosity at 25° C. and 100 l/s of <5000 mPas, preferably <3000 mPas and more preferably <2000 mPas.

The invention further provides a flocculation-stabilizing medium comprising

10% to 90% by weight, preferably 20% to 80% by weight and more preferably 40% to 60% by weight of the reaction products (a1) and
90% to 10% by weight, preferably 80% to 20% by weight and more preferably 60% to 40% by weight of the reaction products (a2), based on the sum total of reaction products (a1) and reaction products (a2) of 100% by weight, which can preferably be used for production of pigment preparations.

The invention also provides for the use of the universal pigment preparation according to the invention for production of paints, varnishes, printing inks, coating materials, floor coatings, potting compounds and filling compounds.

Suitable paint systems into which the universal pigment preparations according to the invention can be incorporated are any solventborne or aqueously formulated one-component or two-component paint systems (1K or 2K), but also solvent-free systems.

Examples of 1K paint systems are those based on alkyd, acrylate, styrene acrylate, epoxy, polyvinyl acetate, polyester or polyurethane binders. Any kind of curing is possible, for example by oxidative drying, physical drying, self-crosslinking, UV or electron beam curing or crosslinking by baking.

2K paint systems crosslink as a result of the addition of at least one hardener component. Frequently, however, crosslinking mechanisms are combined in order to achieve a better shelf life. All combinations of curing mechanisms are permissible here. For example, hydroxyl-containing polyesters or polyacrylate resins can be crosslinked with isocyanates or blocked isocyanates or melamine resins as 2K systems. Mention should further be made of epoxy systems, where the epoxy binder is reacted with an amine hardener.

The invention further provides the process for producing the universal pigment preparation, wherein the reaction products (a1) and the reaction products (a2) are first produced and then mixed, with no addition of volatile organic solvents and/or water, and then the pigments are mixed in.

Preferably, further components can be added.

The abovementioned sequence of process steps can be chosen freely.

Volatile organic solvents are understood to mean compounds having a boiling point below 250° C. (VOCs).

In the present invention, reaction products (a1) and (a2) are not understood to be volatile organic solvents.

The subject-matter of the invention will be described by way of example below, without the invention being restricted to these illustrative embodiments.

Test Methods:

Parameters or measurements are preferably determined using the methods described hereinbelow. In particular, these methods are used in the examples of the present intellectual property right.

GPC 1

The relative molar masses of the inventive reaction products (a1) are determined by size exclusion chromatography (GPC). For this purpose, three columns from Merck (PS 400, 250*7 mm, PS 40, 250*7 mm, and PS 1, 250*7 mm) with a particle size of 5 μm are combined in series. After calibration, 20 μl of the condensation resin solution in tetrahydrofuran (c of condensation resin=20 mg/ml) are injected at 40° C. with a Rheodyne 7125 injector and analysed at a flow rate of 1 ml/min (Waters 510 HPLC pump) at 40° C. with degassed tetrahydrofuran as mobile phase and a differential refractometer at 40° C. (Waters model 410). Evaluation is made after calibration against polystyrene standards, which is carried out in the manner described above. Polystyrene standards (standard 1 Mp 377400, Mp 96000, Mp 20650, Mp 1300, Mp 162; standard 2 Mp 283300, Mp 50400, Mp 10850, Mp 2930, Mp 980; standard 3 Mp 218800, Mp 68900, Mp 10050, Mp 1940, Mp 580; Mp=molar mass at peak maximum) are commercially available, for example, from Merck or Polymer Laboratories.

GPC 2

GPC measurements for determining the polydispersity and the average molar masses Mw or Mn were conducted under the following measurement conditions: SDV 1000/10 000 Å column combination (length 65 cm), temperature 30° C., THF as mobile phase, flow rate 1 ml/min, sample concentration 10 g/l, RI detector, evaluation against polypropylene glycol standard.

Acid numbers were determined according to DIN EN ISO 2114.

The reported viscosities of the inventive reaction products (a1) were determined with an Anton Paar M102 rotary viscometer and with the CP50/2 measurement geometry at 23° C. and a shear rate of 100 l/s.

Glass transition temperatures were determined according to DIN 53765.

Determination of OH Number

Hydroxyl numbers were determined according to the method DGF C-V 17 a (53) of the Deutsche Gesellschaft fur Fettwissenschaft [German Society for Fat Science]. This involved acetylating the samples with acetic anhydride in the presence of pyridine and determining the consumption of acetic anhydride by titration with 0.5 N potassium hydroxide solution in ethanol using phenolphthalein.

1. Preparation of Inventive Reaction Products (a1)

Reaction Products a1-1:

Adipic acid and fumaric acid (molar ratio 1.95:1) were reacted in a molar ratio of the COOH groups to OH groups of 1:1.96 with polypropylene glycol 725 and methyldiethanolamine (molar ratio 12.17:1) at 180° C. to 190° C. under a nitrogen atmosphere until an acid number of 7 mg KOH/g and an OH number of 79 mg KOH/g had been attained.

Mn=2000 g/mol
Mw=3300 g/mol
Glass transition temperature −67° C.
Viscosity at 23° C.: 530 mPas Reaction Products a1-2:

Adipic acid and fumaric acid (molar ratio 1.99:1) were reacted in a molar ratio of the COOH groups to OH groups of 1:2.55 with polypropylene glycol 725 at 240° C. under a nitrogen atmosphere until an acid number of 6 mg KOH/g and an OH number of 85 mg KOH/g had been attained.

Mn=1800 g/mol
Mw=2800 g/mol
Glass transition temperature −68° C.
Viscosity at 23° C.: 408 mPas Polypropylene glycol 725 is available under trade names including ARCOL® PPG-725 from Covestro.

2. Preparation of Reaction Products (a2):

Reaction Products a2-1:

Preparation of a Polyoxyalkylene from Glycerol with PO and EO

An initial charge of 380 g of glycerol and 23.2 g of potassium hydroxide in a 15 liter autoclave was heated to 115° C. while stirring. The reactor was evacuated down to an internal pressure of 30 mbar in order to remove any volatile ingredients present by distillation, and then nitrogen was injected to 3 bar. The internal pressure was then lowered again to <30 mbar. 7868 g of propylene oxide (PO) were metered into the inertized reactor while cooling at internal temperature 115° C. and an internal pressure of 3 to 4 bar (absolute) within 10 h. After further reaction at 115° C. for 1 h, 2729 g of ethylene oxide (EO) were metered into the reactor at internal temperature 115° C. and an internal pressure of 2 to 3 bar (absolute) within 3 h. Subsequently, volatile components were removed by distillation under reduced pressure at 115° C. After further reaction at 115° C. for 1 h, the reaction product was cooled down to 90° C., neutralized with phosphoric acid and discharged from the reactor via a filter. The product was almost colorless and of low viscosity at room temperature. The OH number was 63 mg KOH/g, and the acid number 0.1 mg KOH/g. According to GPC 2, the product has a weight-average molar mass $M_w$ of 2267 g/mol and a polydispersity $M_w/M_n$ of 1.04.

Reaction Products a2-2:

Preparation of Ethoxylated Sorbitan Monooleate

An initial charge of 1500 g of sorbitan monooleate and 2.6 g of potassium hydroxide solution (45%) in a 7 liter autoclave was heated to 120° C. while stirring. The reactor was evacuated down to an internal pressure of 30 mbar in order to remove water and any other volatile ingredients present by distillation, and then nitrogen was injected to 3 bar. The internal pressure was then lowered again to <30 mbar. 3050 g of ethylene oxide were metered into the inertized reactor while cooling at internal temperature 160° C. and an internal pressure of 3 to 4 bar (absolute) within 3 h. After further reaction at 160° C. for 1 h, the reaction product was cooled down to 120° C. and degassed at <30 mbar. This was followed by cooling to 90° C., neutralization with lactic acid and discharge from the reactor via a filter. The liquid product was pale yellowish. The OH number was 71 mg KOH/g, and the acid number 0.4 mg KOH/g. According to GPC 2, the product has a weight-average molar mass $M_w$ of 1704 g/mol and a polydispersity $M_w/M_n$ of 1.18.

3. Production of the Universal Pigment Preparations According to the Invention and Comparative Preparations for Testing the Viscosity According to the formulations specified in Table 2, the inventive reaction products (a1) and (a2) were used to produce a universal pigment preparation (P1 to P9). For comparison, pigment preparations were made up with grinding resins that are standard on the market rather than the reaction products (a1) and the inventive reaction products (a2) (CM P1 to CM P6).

The reaction products (a1) and the comparative products were initially charged in PE cups, and then reaction products (a2) and further liquid components were metered in. The mixture was manually homogenized briefly with a metal spatula and then the pigment was weighed in. After manual rehomogenization, a defined amount of glass beads was weighed in (see Table 1). Dispersion was effected in a Hauschild Speedmixer at a speed of 2000 rpm and with the dispersing times specified in the table. The universal pigment preparations according to the invention thus obtained were screened through a 250 μm high-speed nylon screen.

TABLE 1

| Dispersing parameters | | |
|---|---|---|
| | Glass beads (g) (d = 1.1 mm) | Dispersion time |
| Heliogen blue L7085 | 50 | 8 min |
| Special black 4 | 50 | 8 min |
| Bayferrox 130 M | 30 | 4 min |

Measurement of the Viscosities of the Preparations:

The viscosities of the universal pigment preparations according to the invention and comparative examples were measured with a Haake RheoStress 1 rheometer. Measurement parameters: cone/plate C35/2°, 23° C., multiple measurement points in the range of 1-1000 l/s. The viscosity was evaluated at 100 l/s. The results are listed in Table 2.

TABLE 2

Formulations for production of the inventive universal pigment preparations (P) and comparative examples comprising grinding resins that are customary on the market (CM P)

| | P1 | P2 | P3 | P4 | P5 | P6 | P7 | P8 | P9 | CM P1 | CM P2 | CM P3 | CM P4 | CM P5 | CM P6 |
|---|---|---|---|---|---|---|---|---|---|---|---|---|---|---|---|
| a1-2 | 17.2 | 17.5 | 11 | 17.2 | 17.5 | 11 | | | | | | | | | |
| a1-1 | | | | | | | 17.2 | 17.5 | 11 | | | | | | |
| a2-2 | 25.6 | 26.2 | 16.4 | | | | 25.6 | 26.2 | 16.4 | 25 | 25.5 | 10.5 | 25 | 25.5 | 10.5 |
| a2-1 | | | | 25.6 | 26.2 | 16.4 | | | | | | | | | |
| TEGO® VariPlus TC | | | | | | | | | | 16.7 | 17 | 15.8 | | | |
| Laropal A81 | | | | | | | | | | | | | 16.7 | 17 | 15.8 |
| TEGO® Dispers 656 | | | | | | | | | | | 1.2 | 1.1 | | 1.2 | 1.1 |
| TEGO® Dispers 650 | | | | | | | | | | 1.1 | | | 1.1 | | |
| Dimethyl-amino-ethanol | 0.2 | 0.3 | 0.1 | 0.2 | 0.3 | 0.1 | 0.2 | 0.3 | 0.1 | 0.2 | 0.3 | 0.1 | 0.2 | 0.3 | 0.1 |
| Heliogen blue L7085 | 7 | | | 7 | | | 7 | | | 7 | | | 7 | | |
| Special black 4 | | 6 | | | 6 | | | 6 | | | 6 | | | 6 | |
| Bayferrox® 130 M | | | 22.5 | | | 22.5 | | | 22.5 | | | 22.5 | | | 22.5 |
| Total | 50 | 50 | 50 | 50 | 50 | 50 | 50 | 50 | 50 | 50 | 50 | 50 | 50 | 50 | 50 |
| Producible? | yes | yes | yes | yes | yes | yes | yes | yes | yes | yes | yes | no | yes | yes | no |
| Viscosity at 100 1/s in mPas | 1885 | 3214 | 1412 | 1940 | 2392 | 1146 | 2084 | 830 | 1179 | 4576 | 5035 | | 6869 | 8283 | |

All the inventive universal pigment preparations P1-P9 were producible. The comparative preparations CM P1-CM P6 exhibited a much higher viscosity and hence limited flowability, or could not be produced at all.

4. Verification of the Universal Usability of the Universal Pigment Preparations According to the Invention in Various Paint Systems To verify the universal usability of the universal pigment preparations according to the invention and the comparative preparations, these are used for tinting of various conventional (solventborne) and aqueous paint systems. It is standard practice on the market to test usability on the basis of appearance, on the basis of color strength and finally on the basis of the "rub-up value" (ΔE). To determine the rub-up value, after the paint has been applied and shortly before it has dried through, a small area is rubbed with a finger. At this site, the pigments are stirred up again. Ideally, no difference arises between the rubbed and the unrubbed area. For this invention, color strength and rub-up value were considered relative to one another.

Four different white basecoats were used, each of which was mixed with the inventive universal pigment preparations P. The formulations are described below.

4.1 Production of a Colored Basecoat 1 Based on an Aqueous 2K PU Acrylate System 4.1.1 First of all, a clearcoat 1 according to Table 3 and a white paste 1 according to Table 4 are produced.

TABLE 3

Formulation for clearcoat 1

| | Amount (g) |
|---|---|
| Bayhydrol A 145 | 58.3 |
| Dimethylaminoethanol (20% in H$_2$O) | 1.4 |
| Demineralized water | 15.3 |

TABLE 4

Formulation for white paste 1

| | Amount (g) |
|---|---|
| Demineralized water | 18.4 |
| TEGO Dispers 755 W | 10 |
| TEGO Foamex 830 | 1 |
| Aerosil 200 | 0.5 |
| Kronos 2310 | 70 |
| Parmetol K40 | 0.1 |

For production of the basecoat 1, 65.2 parts of the clearcoat 1 are blended with 34.8 parts of the white paste 1 while stirring.

4.1.2 Production of a Colored Basecoat 1

The white basecoat 1 is initially charged in a PE cup and the inventive universal pigment preparation P according to Table 6-8 is metered in. This is followed by homogenization in a Speedmixer at 2000 rpm for 1 min. The hardener 1 is added and the mixture is mixed at 2000 rpm for a further 1 min. The paints obtained are applied to glass plates with wet film thickness 150 μm with the aid of a bar applicator. After brief drying, the rub-up test is conducted by rubbing the applied paint with a finger. Subsequently, the paint drawdowns obtained are dried at room temperature for 24 h and then cured at 80° C. for another 2 h.

Curing is accomplished using an isocyanate hardener (hardener 1) according to the following formulation:

TABLE 5

Formulation for hardener 1

| | Amount (g) |
|---|---|
| Bayhydur 3100 | 8 |
| Methoxypropyl acetate | 2 |

TABLE 6

Formulation for blue-colored basecoat 1

| | Amount (g) |
|---|---|
| White basecoat 1 | 8.22 |
| Hardener 1 | 1.78 |
| Universal pigment preparation P1, P4 or P7 | 0.57 |

TABLE 7

Formulation for black-colored basecoat 1

| | Amount (g) |
|---|---|
| White basecoat 1 | 8.22 |
| Hardener 1 | 1.78 |
| Universal pigment preparation P2, P5 or P8 | 0.67 |

TABLE 8

Formulation for red-colored basecoat 1

| | Amount (g) |
|---|---|
| White basecoat 1 | 8.22 |
| Hardener 1 | 1.78 |
| Universal pigment preparation P3, P6 or P9 | 0.45 |

4.2 Production of a Colored Basecoat 2 Based on an Aqueous 1K Styrene Acrylate 4.2.1 First of all, a Clearcoat 2 According to Table 9 and a White Paste 2 According to Table 10 are Produced.

TABLE 9

Formulation for clearcoat 2

| | Amount (g) |
|---|---|
| Revacryl AE 6030 | 76.2 |
| TEGO Foamex 855 (25% strength) | 0.6 |
| Butylglycol | 5.5 |
| Premix and adjust pH to 8.5 with ammonia | |
| Millicarb OG | 8.7 |
| Finntalc M 15 | 5.6 |
| TEGO ViskoPlus 3060 | 1.5 |
| TEGO Foamex 855 (25% strength) | 0.6 |
| Petroleum spirit | 1.3 |
| Adjust pH to 8.5 with ammonia | |

TABLE 10

Formulation for white paste 2

| | Amount (g) |
|---|---|
| Demineralized water | 18.4 |
| TEGO Dispers 755 W | 10 |
| TEGO Foamex 830 | 1 |
| Aerosil 200 | 0.5 |
| Kronos 2310 | 70 |
| Parmetol K40 | 0.1 |

For production of the basecoat 2, 71.4 parts of the clearcoat 2 are blended with 28.6 parts of the white paste 2 while stirring.

4.2.2 Production of a Colored Basecoat 2

The white basecoat 2 is initially charged in a PE cup and the universal pigment preparation P according to Tables 11-13 is metered in. This is followed by homogenization in a Speedmixer at 2000 rpm for 1 min. The paints obtained are applied to glass plates with wet film thickness 150 μm with the aid of a bar applicator. After brief drying, the rub-up test is conducted by rubbing the applied paint with a finger. Subsequently, the paint drawdowns obtained are dried at room temperature for 24 hours and then cured at 80° C. for another 2 h.

TABLE 11

Formulation of blue-colored basecoat 2

| | Amount (g) |
|---|---|
| White basecoat 2 | 10.00 |
| Universal pigment preparation P1, P4 or P7 | 0.57 |

TABLE 12

Formulation of black-colored basecoat 2

| | Amount (g) |
|---|---|
| White basecoat 2 | 10.00 g |
| Universal pigment preparation P2, P5 or P8 | 0.67 g |

TABLE 13

Formulation of red-colored basecoat 2

| | Amount (g) |
|---|---|
| White basecoat 2 | 10.00 g |
| Universal pigment preparation P3, P6 or P9 | 0.45 g |

4.3 Production of a Colored Basecoat 3

4.3.1 the Basecoat 3 is a Commercial Standard White Alkyd Resin Paint "Impredur Hochglanzlack 840" from Brillux.

4.3.2 Production of a Colored Basecoat 3

The white basecoat 3 is initially charged in a PE cup and the universal pigment preparation P according to Tables 14-16 is metered in. This is followed by homogenization in a Speedmixer at 2000 rpm for 1 min. The paints obtained are applied to glass plates with wet film thickness 150 μm with the aid of a bar applicator. After brief drying, the rub-up test is conducted by rubbing the applied paint with a finger. Subsequently, the paint drawdowns obtained are dried at room temperature for 24 hours and then cured at 80° C. for another 2 h.

TABLE 14

Formulation of blue-colored basecoat 3

|  | Amount (g) |
|---|---|
| White basecoat 3 | 10.00 |
| Universal pigment preparation P1, P4 or P7 | 0.57 |

TABLE 15

Formulation of black-colored basecoat 3

|  | Amount (g) |
|---|---|
| White basecoat 3 | 10.00 |
| Universal pigment preparation P2, P5 or P8 | 0.67 |

TABLE 16

Formulation of red-colored basecoat 3

|  | Amount (g) |
|---|---|
| White basecoat 3 | 10.00 |
| Universal pigment preparation P3, P6 or P9 | 0.45 |

4.4 Production of a Colored Basecoat 4 Based on a Solventborne 2K PU Polyester Polyol System 4.4.1 a White Basecoat 4 According to Table 17 is Produced.

TABLE 17

Formulation for white basecoat 4

|  | Amount (g) |
|---|---|
| Setal 1603 | 20 |
| TEGO Airex 990 | 0.1 |
| TEGO Dispers 628 | 1.8 |
| Kronos 2310 | 30 |
| Blanc Fixe Micro | 29 |
| Finntalk M 15 | 3 |
| Butyl acetate | 4.5 |
| Dispersing in a Skandex for 1 h | |
| TEGO Glide 110 | 0.5 |
| Solvent Naphtha 170 (Hydrosol A170) | 0.5 |
| TIB KAT 716 1% in BA | 4 |
| Butyldiglycol acetate | 0.5 |
| Setal 1603 | 6.1 |

Curing is accomplished using an isocyanate hardener (hardener 2) according to the following formulation:

TABLE 18

Formulation for hardener 2

|  | Amount (g) |
|---|---|
| Desmodur N3600 | 9 |
| Butyl acetate | 1 |

4.4.2 Production of a Colored Basecoat 4

The white basecoat 4 is initially charged in a PE cup and the universal pigment preparation P according to Tables 19-21 is metered in. This is followed by homogenization in a Speedmixer at 2000 rpm for 1 min. The hardener is added and the mixture is mixed at 2000 rpm for a further 1 min. The paints obtained are applied to glass plates with wet film thickness 150 μm with the aid of a bar applicator. After brief drying, the rub-up test is conducted by rubbing the applied paint with a finger. Subsequently, the paint drawdowns obtained are dried at room temperature for 24 h and then cured at 80° C. for another 2 h.

TABLE 19

Formulation of blue-colored basecoat 4

|  | Amount (g) |
|---|---|
| White basecoat 4 | 8.60 |
| Hardener 2 | 1.40 |
| Universal pigment preparation P1, P4 or P7 | 0.75 |

TABLE 20

Formulation of black-colored basecoat 4

|  | Amount (g) |
|---|---|
| White basecoat 4 | 8.60 |
| Hardener 2 | 1.40 |
| Universal pigment preparation P2, P5 or P8 | 0.86 |

TABLE 21

Formulation of red-colored basecoat 4

|  | Amount (g) |
|---|---|
| White basecoat 4 | 8.60 |
| Hardener 2 | 1.40 |
| Universal pigment preparation P1, P4 or P7 | 0.58 |

5. Production of Comparative Examples CM P7 to CM P12

The inventive basecoats 1-4 are compared with water-based pigment preparations that are standard on the market (CM P7, CM P9, CM P11) and solvent-based pigment preparations (CM P8, CM P10, CM P12) produced according to Table 22:

TABLE 22

Production of comparative examples

|  | CM P7 | CM P8 | CM P9 | CM P10 | CM P11 | CM P12 |
|---|---|---|---|---|---|---|
| Laropal A81 (60% in MPA) |  | 15.2 |  | 15 | 5 |  |
| TEGO ® VariPlus DS 50 | 20.8 |  | 13.8 |  |  | 9.5 |
| TEGO ® Dispers 670 |  |  |  | 7.8 |  | 2 |
| TEGO ® Dispers 656 |  | 2.5 |  |  |  | 0.9 |
| TEGO ® Dispers 750 W | 7.5 |  | 6.6 |  | 4 |  |
| TEGO ® Foamex 810 | 0.5 |  | 0.5 |  | 0.5 |  |
| 2-Amino-2-methyl-1-propanol |  |  |  | 0.2 |  | 0.1 |
| Heliogen blue L7085 | 12.5 | 12.5 |  |  |  |  |
| Special black 4 |  |  | 11 | 12.5 |  |  |
| Bayferrox 130 M |  |  |  |  | 30 | 32.5 |

TABLE 22-continued

Production of comparative examples

|  | CM P7 | CM P8 | CM P9 | CM P10 | CM P11 | CM P12 |
|---|---|---|---|---|---|---|
| Water | 8.7 |  | 17.9 |  | 10.4 |  |
| Methoxypropyl acetate |  | 19.8 |  | 14.7 |  | 5.1 |
| Total | 50 | 50 | 50 | 50 | 50 | 50 |

All liquid components were initially charged and manually homogenized briefly with a metal spatula. Subsequently, the pigment was weighed in and the mixture was manually homogenized again. A defined amount of glass beads was added and, after the dispersion time specified in Table 1, dispersed in a Hauschild Speedmixer at a speed of 2000 rpm. The pigment preparations thus obtained were screened through a 250 µm high-speed nylon screen.

6. Assessment of Coloring Capacity

The assessment of the coloring capacity of the colored basecoats 1-4 is effected on the basis of the measurement of color strength and the rub-up intensity ($\Delta E$). This is done by using the X-Rite SP-62 colorimeter to analyse and compare the Lab* values of the rubbed area and the unrubbed area. The difference in hue $\Delta E$ in the rubbed area relative to the unrubbed area is calculated according to formula (III):

$$\Delta E = \sqrt{(L_{RB}^* - L_0^*)^2 + (a_{RB}^* - a_0^*)^2 + (b_{RB}^* - b_0^*)^2}$$  Formula (III)

The color strength F is calculated in accordance with Kubelka/Munk via the tristimulus value Y according to formula (IV) and (V):

$$Y = \left(\frac{L_0^* + 16}{116}\right)^3 \cdot 100$$  Formula (IV)

$$F = \frac{(100 - Y)^2}{2 \cdot Y}$$  Formula (V)

TABLE 23

Results for the coloring capacity of aqueous and solventborne basecoats with Heliogen blue L7085

|  |  | P1 | P4 | P7 | CM P1 | CM P4 | CM P7 | CM P8 |
|---|---|---|---|---|---|---|---|---|
| Basecoat 1 | Color strength | 47.82 | 48.10 | 48.60 | 17.57 | 20.69 | 38.04 | — |
|  | $\Delta E$ | 1.68 | 0.6 | 1.24 | 20.4 | 17.42 | 4.87 | — |
|  | Visual compatibility | compatible | compatible | compatible | incompatible | incompatible | compatible | immiscible |
| Basecoat 2 | Color strength | 53.04 | 53.80 | 0.78 | 26.57 | 3.95 | 46.22 | — |
|  | $\Delta E$ | 1.75 | 0.6 | 1.13 | 16.29 | 6.48 | 2.81 | — |
|  | Visual compatibility | compatible | compatible | compatible | incompatible | incompatible | compatible | immiscible |
| Basecoat 3 | Color strength | 50.37 | 51.43 | 59.16 | 37.63 | 2.99 | — | 48.13 |
|  | $\Delta E$ | 3.67 | 2.5 | 2.24 | 38.28 | 1.94 | — | 4.61 |
|  | Visual compatibility | compatible | compatible | compatible | compatible | compatible | immiscible | compatible |
| Basecoat 4 | Color strength | 41.96 | 41.11 | 41.11 | 41.21 | 41.93 | — | 38.69 |
|  | $\Delta E$ | 1.65 | 1.01 | 1.41 | 0.96 | 0.97 | — | 1.97 |
|  | Visual compatibility | compatible | compatible | compatible | compatible | compatible | immiscible | compatible |

TABLE 24

Results for the coloring capacity of various aqueous and solventborne basecoats with black pigment

|  |  | P2 | P5 | P8 | CM P2 | CM P5 | CM P9 | CM P10 |
|---|---|---|---|---|---|---|---|---|
| Basecoat 1 | Color strength | 170.67 | 152.79 | 179.13 | 24.47 | 26.19 | 173.60 | — |
|  | $\Delta E$ | 1.5 | 2.56 | 0.36 | 26.8 | 26.07 | 1.56 | — |
|  | Visual compatibility | compatible | compatible | compatible | incompatible | incompatible | compatible | immiscible |
| Basecoat 2 | Color strength | 187.38 | 177.28 | 188.58 | 96.06 | 71.77 | 190.46 | — |
|  | $\Delta E$ | 1.3 | 1.27 | 0.10 | 2.35 | 14.9 | 0.31 | — |
|  | Visual compatibility | compatible | compatible | compatible | incompatible | incompatible | compatible | immiscible |
| Basecoat 3 | Color strength | 190.87 | 206.19 | 221.58 | 190.26 | 188.73 | — | 218.99 |
|  | $\Delta E$ | 1.73 | 1 | 0.10 | 0.87 | 1.88 | — | 1.32 |
|  | Visual compatibility | compatible | compatible | compatible | compatible | compatible | immiscible | compatible |
| Basecoat 4 | Color strength | 133.19 | 122.82 | 128.05 | 130.24 | 137.20 | — | 102.59 |
|  | $\Delta E$ | 2.19 | 2.2 | 1.58 | 0.37 | 0.8 | — | 6.24 |
|  | Visual compatibility | compatible | compatible | compatible | compatible | compatible | immiscible | compatible |

TABLE 25

Results for the coloring capacity of various aqueous
and solventborne basecoats with Bayferrox 130 M

|  |  | P3 | P6 | P9 | CM P11 | CM P12 |
|---|---|---|---|---|---|---|
| Basecoat 1 | Color strength | 46.63 | 44.45 | 51.15 | 49.12 | — |
|  | ΔE | 1.82 | 1.48 | 0.46 | 2.75 | — |
|  | Visual compatibility | compatible | compatible | compatible | compatible | immiscible |
| Basecoat 2 | Color strength | 53.64 | 58.91 | 54.09 | 58.04 | — |
|  | ΔE | 0.79 | 1.63 | 0.38 | 0.85 | — |
|  | Visual compatibility | compatible | compatible | compatible | compatible | immiscible |
| Basecoat 3 | Color strength | 52.48 | 49.06 | 59.16 | — | 54.98 |
|  | ΔE | 1.02 | 1.48 | 0.54 | — | 0.38 |
|  | Visual compatibility | compatible | compatible | compatible | immiscible | compatible |
| Basecoat 4 | Color strength | 40.78 | 40.42 | 39.38 | — | 39.91 |
|  | ΔE | 1.83 | 0.53 | 0.84 | — | 1.57 |
|  | Visual compatibility | compatible | compatible | compatible | immiscible | compatible |

It can clearly be seen from the results shown in Table 23 to Table 25 that the basecoats comprising the universal pigment preparations according to the invention have universal compatibility in all paint systems. For this purpose, the visual appearance is considered, and the color strength and the magnitude of the ΔE value are also compared relative to one another. The comparative examples based on the commercial standard resins (CM P1 to CM P6) show good compatibility in the solventborne systems, but fail in the aqueous range. The pigment preparations CM P7 to CM P12 that are standard on the market are not universally usable because of their solvent content and/or water content. When compared in the respective medium, it is found that the basecoats comprising the universal pigment preparations according to the invention give very similar or even better results.

TABLE 26

Materials used

| Materials | Company | |
|---|---|---|
| Aerosil 200 | Evonik Industries AG | Filler |
| Bayferrox ® 130 M | Lanxess | Pigment |
| Bayhydrol A 145 | Covestro | Binder |
| Bayhydur 3100 | Covestro | Hardener |
| Blanc Fixe Micro | Solvay | Filler |
| Desmodur N3600 | Covestro | Hardener |
| Finntalk M 15 | Mondominerals | Filler |
| Heliogen blue L7085 | BASF | Pigment |
| Impredur High Gloss Enamel 840 | Brillux | Alkyd resin paint |
| Kronos 2310 | Kronos | Pigment |
| Laropal A81 | BASF | Binder |
| Laropal A81 (60% in MPA) | BASF | Binder, self-diluted |
| Millicarb OG ( ) | Omya | Filler |
| Parmetol K40 | Schülke | Preservative |
| Revacryl AE 6030 | Synthomer | Binder |
| Setal 1603 ( ) | Nuplex | Binder |
| Solvent Naphtha 170 (Hydrosol A170) | DHC Solvent Chemie | Volatile organic solvent |
| Special black 4 | Orion Engineered Carbons | Pigment |
| TEGO ® Airex 990 | Evonik Industries AG | Deaerating agent |
| TEGO ® Dispers 628 | Evonik Industries AG | Dispersant |
| TEGO ® Dispers 650 | Evonik Industries AG | Dispersant |
| TEGO ® Dispers 656 | Evonik Industries AG | Dispersant |
| TEGO ® Dispers 656 | Evonik Industries AG | Dispersant |
| TEGO ® Dispers 670 | Evonik Industries AG | Dispersant |
| TEGO ® Dispers 750 W | Evonik Industries AG | Dispersant |
| TEGO ® Dispers 755 W | Evonik Industries AG | Dispersant |
| TEGO ® Foamex 810 | Evonik Industries AG | Defoamer |
| TEGO ® Foamex 830 | Evonik Industries AG | Defoamer |
| TEGO ® Foamex 855 (25%) | Evonik Industries AG | Defoamer |
| TEGO ® Glide 110 | Evonik Industries AG | Surface additive |
| TEGO ® VariPlus DS 50 | Evonik Industries AG | Binder |
| TEGO ® ViskoPlus 3060 | Evonik Industries AG | Thickener |

TABLE 26-continued

| Materials used | | |
|---|---|---|
| Materials | Company | |
| TEGO ® VariPlus TC | Evonik Industries AG | Binder |
| TIB KAT 716 1% in BA | TIB Chemicals | Curing catalyst |

7. Nonvolatile Content of the Universal Pigment Preparations According to the Invention The nonvolatile content (NVC) of the inventive universal pigment preparations comprising Heliogen blue is determined by drying the sample. For this purpose, a sample of about 1 g is weighed accurately to 1 mg into an aluminium boat having a diameter of 6 cm, and the latter is dried in an oven at 130° C. for 2 h and then weighed again. The absolute loss is determined and this is used to calculate the nonvolatile content in percent. The higher the percentage, the lower the level of volatile substances that are released into the indoor environment.

TABLE 27

Nonvolatile organic content of the universal pigment preparations according to the invention

| Pigment preparations | NVC in % |
|---|---|
| P1 | 97.0 |
| P4 | 96.1 |
| P7 | 97.1 |
| CM P8 | 48.2 |

The nonvolatile content (NVC) of the universal pigment preparations according to the invention is well above 90%. They therefore contain just a very small content of volatile organic constituents.

The invention claimed is:

1. A universal pigment preparation comprising
a flocculation-stabilizing medium comprising
(a1) reaction products of di- or polycarboxylic acids or hydroxycarboxylic acids with di- or polyols,
and
(a2) reaction products of alkylene oxides with alkoxylatable compounds, wherein the reaction products (a2) are prepared by an alkoxylation reaction of alkoxylatable compounds of the formula (II)

Formula (II)

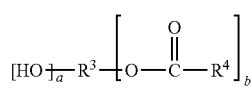

where
$R^3$ is a linear or branched, saturated or mono- or polyunsaturated, aliphatic, cycloaliphatic or aromatic hydrocarbyl radical having 2 to 50 carbon atoms, which may be interrupted by heteroatoms selected from the group consisting of oxygen, nitrogen and sulphur,
$R^4$ is a linear or branched, saturated or mono- or polyunsaturated aliphatic, cycloaliphatic or aromatic hydrocarbyl radical which may be interrupted by heteroatoms selected from the group consisting of oxygen, nitrogen and sulphur and may be substituted by OH groups, having 1 to 22 carbon atoms,
a=2 to 6,
b=1 to 4, wherein the sum total of a and b=3 to 6, with alkylene oxides
and
at least one pigment.

2. The universal pigment preparation according to claim 1, wherein the weight ratio of flocculation-stabilizing medium to pigment is 95:5 to 5:95.

3. The universal pigment preparation according to claim 1, wherein the weight ratio of reaction products (a1) to reaction products (a2) is 10:90 to 90:10.

4. The universal pigment preparation according to claim 1, wherein the di- or polycarboxylic acids are saturated and/or unsaturated and/or aromatic di- or polycarboxylic acids and the anhydrides or esters thereof.

5. The universal pigment preparation according to claim 1, wherein the di- or polycarboxylic acids are mixtures of saturated and α,β-unsaturated di- or polycarboxylic acids in a molar ratio of 80:20 to 40:60.

6. The universal pigment preparation according to claim 1, wherein the di- or polycarboxylic acids are citraconic, fumaric, itaconic, maleic and/or mesaconic acid, phthalic acid, isophthalic acid, terephthalic acid, cyclohexane-1,4-dicarboxylic acid, malonic acid, succinic acid, glutaric acid, methyltetra- and methylhexahydrophthalic acid, hexahydrophthalic acid, tetrahydrophthalic acid, dodecanedioic acid, pimelic acid, adipic acid, azelaic acid, suberic acid, sebacic acid, pyromellitic acid and trimellitic acid or the anhydrides or esters thereof or mixtures thereof.

7. The universal pigment preparation according to claim 1, wherein the di- or polyols are polyethylene glycols of the formula (I)

Formula (I)

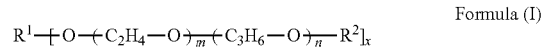

with
x=1, 2, 3 or 4 to 10,
wherein in the case that x=1 the $R^1$ and $R^2$ radicals are hydrogen,
in the case that x=2, 3 or 4 to 10 the $R^1$ radical is a linear or branched, saturated or mono- or polyunsaturated aliphatic, cycloaliphatic or aromatic hydrocarbyl radical having 2 to 50 carbon atoms, which may be interrupted by heteroatoms oxygen, nitrogen or sulphur, and $R^2$ is a hydrogen, where the segments attached to $R^1$ in a number of x may be of the same or different structure,
m=0, 1, 2 or 3 to 100,
n=0, 1, 2 or 3 to 100, and
wherein the product x*(m+n)=2, 3 or 4 to 100.

8. The universal pigment preparation according to claim 7, wherein the repeat units $(-C_2H_4-O-)_m$ and $(-C_3H_6-O-)_n$ are arranged in blocks, in random distribution or in a gradient distribution in the polymer chain.

9. The universal pigment preparation according to claim 7, wherein the polyalkylene glycols are polypropylene glycols or polypropylene-polyethylene glycols having a number-average molar mass of 100 to 2000 g/mol.

10. The universal pigment preparation according to claim 1, wherein the reaction products (a1) have an OH number between 1 and 450 mg KOH/g.

11. The universal pigment preparation according to claim 10, wherein the reaction products (a1) have a theoretical double bond content of 0 to 3 mmol/g.

12. The universal pigment preparation according to claim 1, wherein the alkoxylatable compounds are diols, polyols, ethylene glycol, diethylene glycol, polyethylene glycol, propylene glycol, dipropylene glycol, polypropylene glycol, polyetherols, hexanediol, butanediol, neopentyl glycol, hexylene glycol, ricinoleic acid, hydroxystearic acid and polyhydroxystearic acid, glycerol, polyglycerol, pentaerythritol, trimethylolpropane, and poly-OH-functional phenols.

13. The universal pigment preparation according to claim 1, wherein the alkylene oxides are selected from the group consisting of ethylene oxide, propylene oxide, butylene oxide and styrene oxide.

14. The universal pigment preparation according to claim 1, wherein the reaction products (a2) have a weight-average molar mass of 300 to 15 000 g/mol.

15. The universal pigment preparation according to claim 1, wherein the pigments are organic or inorganic pigments or carbon black pigments.

16. The universal pigment preparation according to claim 1, comprising
0.5% to 85.5% by weight of reaction products (a1),
0.5% to 85.5% by weight of reaction products (a2) and
5% to 95% by weight of at least one pigment selected from the group of the organic, inorganic or carbon black pigments.

17. The universal pigment preparation according to claim 16, wherein dispersing additives and/or further auxiliary components are added.

18. The universal pigment preparation according to claim 17, wherein the volatile organic component is <20% by weight.

19. The universal pigment preparation according to claim 18, wherein it has a free-flowing consistency at room temperature.

20. The universal pigment preparation according to claim 19, wherein it has a viscosity at 25° C. and 100 l/s of <5000 mPas.

21. The universal pigment preparation according to claim 20, wherein it does not include any organic solvent having a boiling point below 250° C. or any water.

22. The process for producing the universal pigment preparation according to claim 1, wherein the reaction products (a1) and the reaction products (a2) are first produced and then mixed, with no addition of volatile organic solvents and/or water, then the pigments are mixed in.

* * * * *